United States Patent [19]

Ashall

[11] Patent Number: 5,390,436
[45] Date of Patent: Feb. 21, 1995

[54] DISPLAY SYSTEM

[75] Inventor: John Ashall, Runaway Bay, Australia

[73] Assignee: Illumination Research Group, Inc., Greensboro, N.C.

[21] Appl. No.: 30,416

[22] PCT Filed: Sep. 20, 1991

[86] PCT No.: PCT/AU91/00436

§ 371 Date: Apr. 29, 1993

§ 102(e) Date: Apr. 29, 1993

[87] PCT Pub. No.: WO92/05535

PCT Pub. Date: Apr. 2, 1992

[30] Foreign Application Priority Data

Sep. 20, 1990 [AU] Australia .............. PK 2392

[51] Int. Cl.$^6$ .............................. G09F 13/18
[52] U.S. Cl. ........................... 40/546; 362/31
[58] Field of Search ............... 40/546, 547, 572, 582; 362/31

[56] References Cited

U.S. PATENT DOCUMENTS

| 3,241,256 | 3/1966 | Viret et al. | 40/546 |
| 4,385,343 | 5/1983 | Plumly | 362/31 |
| 4,386,476 | 6/1983 | Schulman | 40/546 |
| 4,715,137 | 12/1987 | Scheve | 40/546 |
| 4,965,950 | 10/1990 | Yamada | 40/546 |
| 4,974,354 | 12/1990 | Hembrook, Jr. | 40/546 |
| 4,975,809 | 12/1990 | Ku . | |
| 5,043,716 | 8/1991 | Latz et al. | 40/547 X |
| 5,283,968 | 2/1994 | Williams | 40/546 |

FOREIGN PATENT DOCUMENTS

| A49428/85 | 11/1985 | Australia . |
| B20642/88 | 1/1991 | Australia . |
| 2-157791 | 6/1990 | Japan . |
| 2-269382 | 11/1990 | Japan . |
| 206773 | 1/1987 | New Zealand . |

Primary Examiner—Kenneth J. Dorner
Assistant Examiner—J. Silbermann
Attorney, Agent, or Firm—Kinney & Lange

[57] ABSTRACT

An edgelit illuminated display system has a transparent medium having first and second opposing surfaces and at least one edge operable with a light source for illuminating the first and second surfaces. A matrix of dots on each of the surfaces is arranged to allow interaction of light between the surfaces. The matrix of dots on at least one of the surfaces substantially covers the entire surface for providing an even increased illumination throughout the surface, wherein when a graphic image is supported over the surface the graphic image is evenly illuminated.

17 Claims, 2 Drawing Sheets

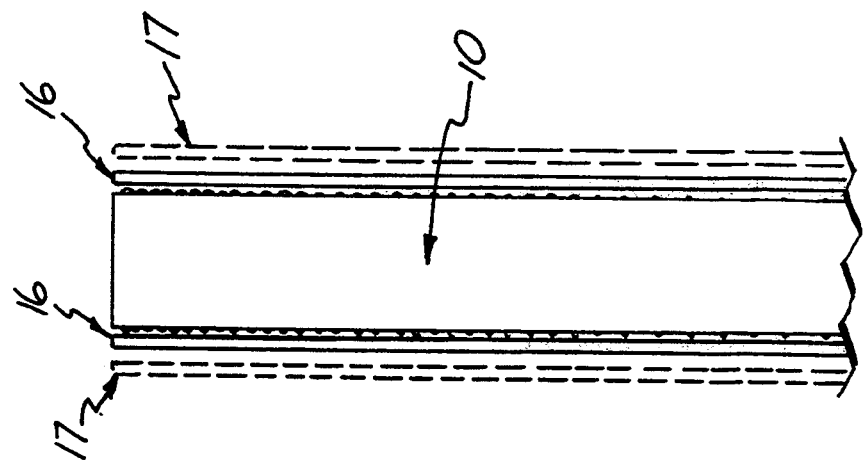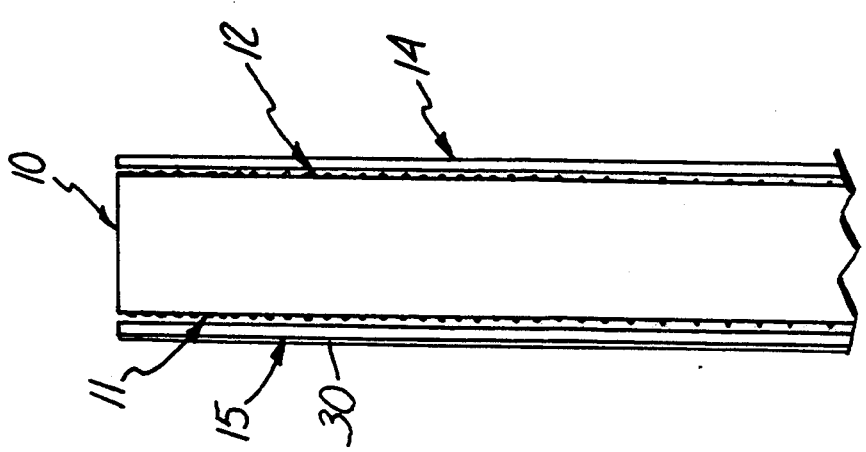

DISPLAY SYSTEM

BACKGROUND OF THE INVENTION

The invention relates to a novel display system, and to in particular illuminated display boards.

Originally, illuminated display boards were essentially display boards with an external light source. For example, a billboard with lights. Smaller displays were generally even less sophisticated and were not even illuminated.

As the market grew and the need for advertising increased so has the need for more sophisticated but just as simple display systems.

With the advent of translucent plastics, back-illuminated signs and displays have become very popular. This type of system essentially comprises a bank of lights, generally the fluorescent variety with a translucent sheet with the sign applied thereto; either by the way of painting or etching and the like. Large banks of lights are often required to illuminate the entire surface of the signs. A disadvantage of such back-illuminated signs is that a large number of lights are required, increasing running costs and maintenance costs since they are continually needing to be replaced. Furthermore, when one light needs to be replaced generally the entire sign needs to be dismantled, which is a great inconvenience when a large sign is involved.

Clear sheet materials with the sign directly applied to the surface have recently been used. However, the problem with these types of signs/displays, as with the back-illuminated signs, a number of lights are required to fully illuminate the sign. In this case the display requires a light source along each edge of the sheet in order for the sign to be illuminated and even then the middle portion of the display is not illuminated to the same degree as the edges.

The prior art has attempted to increase the degree of illumination of translucent and transparent mediums and generally these attempts have not been particularly successful when applied to larger areas which is often the case with signs. Illumination of a small area is generally easier and an attempt at increasing the illumination of a small area is discussed in U.S. Pat. No. 3,241,256. This patent dealt with providing uniform brightness on instrument dials, scales and indicator tapes, generally small in nature. A dot pattern was applied to the rear side of the light transmitting block only wherein the block is supported by a plate. As with previous systems, when larger areas are required to be illuminated, a number of light sources are required to fully illuminate the entire area of the sign.

SUMMARY OF THE INVENTION

The present invention provides a novel illuminated display system which reduces the number of lights required to illuminate the same size display and also alleviate some of the other problems of the prior art.

The invention provides an illuminated display system comprising a transparent medium having two opposing surfaces to be illuminated, wherein both of said surfaces to be illuminated have a matrix of dots substantially covering said surfaces to be illuminated.

The invention also provides an article for use in an illuminated display system comprising a transparent medium having two opposing surfaces to be illuminated wherein both of said surfaces to be illuminated has a matrix of dots substantially covering said surfaces to be illuminated.

The invention further provides an article for fixing on to a transparent sheet used in an illuminated display system comprising a transparent film with a matrix of dots applied thereto.

Surprisingly and advantageously, the illuminated display system of the present invention with a dot matrix applied to both sides of the transparent sheet, provides greater and more even illumination of the sign. This is also true for large signs. The prior art does not discuss this important finding and the theory does not predict that by applying a dot matrix to both sides would enhance illumination significantly. Also by using the system, maintenance is reduced as well as the power requirements.

The light source is generally fixed to only one edge of the transparent sheet. Only in very large signs may another light source be required on another edge.

Furthermore, the density of dots preferably increases along the transparent sheet in the from the edge where the light source is to be fixed.

To increase the density of dots the dots can either increase in number and the gaps between the dots decreases in size or alternatively, the gaps between the dots stay the same and the size of the dots increases.

"Dots" used in the specification and in the claims can be of any shape, for example square, round, rectangular, triangular and in fact can be of irregular shape. The dots are translucent or opaque and more preferably light-coloured for example, white. "Transparent medium" used in the specification and claims means one or more transparent sheets.

The dots can be applied to the transparent sheet by etching, painting, screen printing or any other means of applying a medium to a transparent sheet. Alternatively, the matrix of dots may be applied to a transparent film which then may be adhered to the transparent sheet.

The transparent medium may be glass or plastic but is preferably acrylic.

Generally to form the sign, in the case of a one-sided sign, a backing plate is provided which is generally opaque and light in colour, preferably white.

In the case of a two-sided sign, another sheet with a light coloured face, preferably white, facing the dot matrix of the transparent sheet, is attached. This other sheet may be plain or have the sign applied to the other side. This other sheet should be sufficiently translucent to allow some light to pass through and illuminate the sign. The other sheet may be made of any material including plastics and paper.

The light source can be retained in a carrier which can also act as a support for the transparent sheet. Preferably the light source is a fluorescent tube or depending on the size of the display, a number of tubes.

The article for use in an illuminated display system of the invention can be placed within a box structure wherein translucent panels are provided and the article in combination with the light source acts as an extended light source.

BRIEF DESCRIPTION OF THE DRAWINGS

FIG. 2a illustrates a preferred embodiment of a one-sided sign.

FIG. 2b illustrates a preferred embodiment of a two-sided sign.

Figure 1:
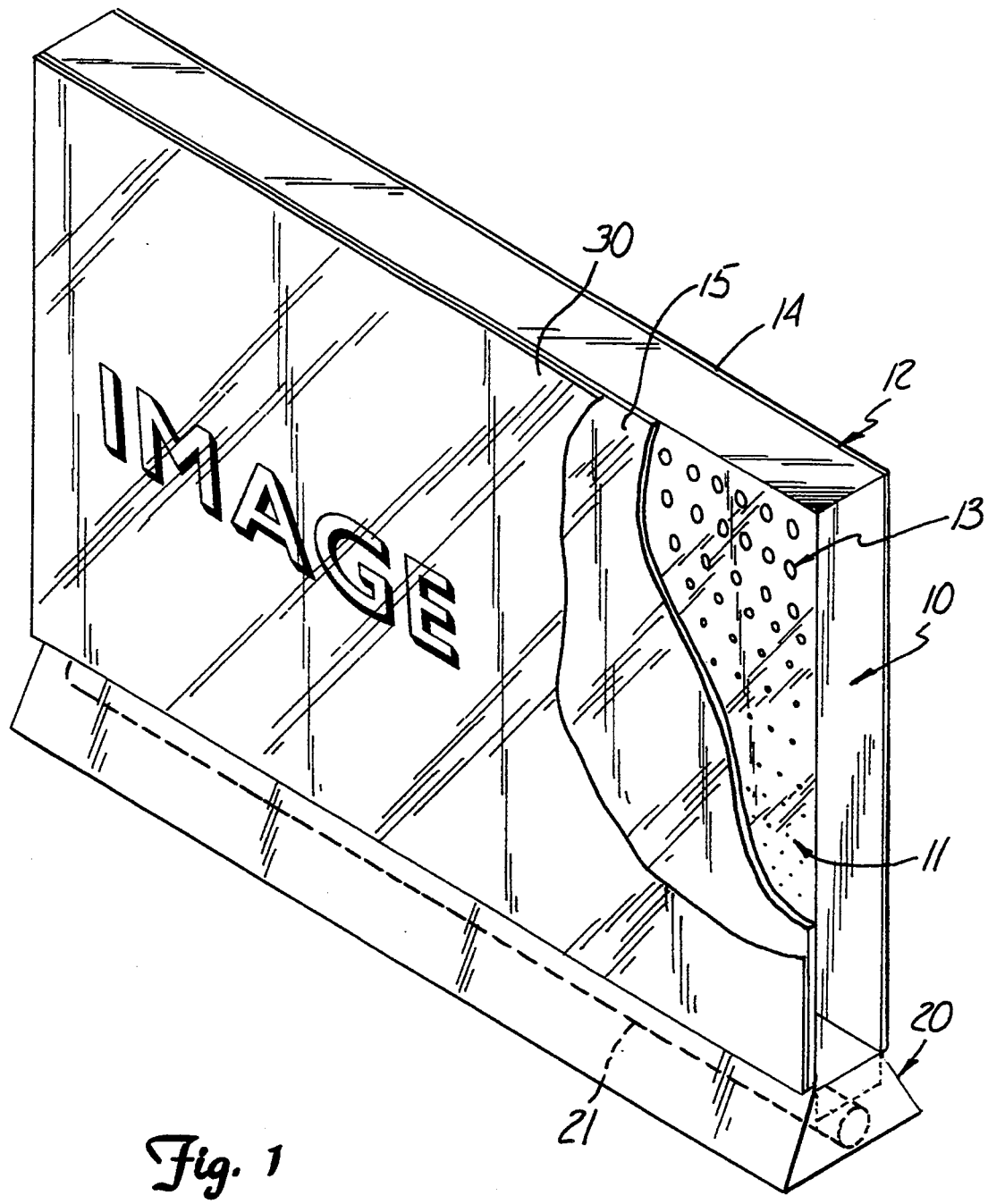
FIG. 1 illustrates a preferred embodiment of an illuminated display system of the present invention.

Item 10 illustrates a transparent sheet 10 with the matrix of dots 13 applied to the surface 11. A matrix of dots 13 is also applied to the other side 12.

DETAILED DESCRIPTION OF THE PREFERRED EMBODIMENTS

The transparent medium 10 can be accommodated in a carrier 20 which also houses a light source 21. It should be noted that the light source can be affixed in alternate ways, providing the light source is substantially on the edge of the transparent medium 10.

FIGS. 1 and 2a illustrates an arrangement for a one-sided sign in accordance with the invention. Transparent medium 10 has dot matrix 13 applied to both surfaces 11 and 12 to be illuminated. A backing sheet 14 which is opaque and preferably white in colour is fixed to the transparent medium 10. FIG. 2a illustrates that there is a gap between each of the layers for clarity only, in practice the layers would be in substantial contact with each other. Sheet 15 has a sign 30 printed on its front side. The side of sheet 15 in substantial contact with transparent medium 10 is light in colour and generally white. Sheet 15 is sufficiently translucent to allow some light to pass through the sheet and illuminate the sign. Materials found to be sufficiently translucent include paper (for example posters) and plastic materials.

FIG. 2b illustrates an arrangement for a two-sided sign in accordance with the invention. In the case of a two-sided sign, sufficiently translucent sheets 16 are fixed to the transparent medium 10 with dot matrix thereon. These sheets 16 may be plain or have the sign applied to the outer face of the sheet. The face contacting the transparent sheet 10, at least, is light coloured and preferably white. Similarly if the sheet 16 is plain, the sheet is preferably light coloured and more preferably white. In the case where sheets 16 are plain, further sheets 17 may be incorporated into the sign system, wherein the sheets 17 have the sign applied thereto. Once again sheets 17 are sufficiently translucent to allow some of the light to pass through and illuminate the sign. Similarly for the one-sided sign sheet 15 may be plain and an additional translucent sheet (not shown) can be fixed in front of the plain sheet 15.

Framework (not shown) or the like, can be used to secure all of the layers together. Similarly the carrier and light source housing 20 can also retain the translucent sign sheet.

To more clearly illustrate the present invention tests were conducted on different sized signs wherein the dot matrix in the first instance is only applied to one side of the transparent medium. The dot matrix in this preferred embodiment is applied by screen printing white dots directly on to the transparent material, in this case perspex. The density of the dot matrix, as indicated previously, increases away from the light source.

Secondly, the dot matrix is applied to both sides of the transparent medium in the same way as for the one-sided application.

In both cases only one edge of the sign had a lighting means attached thereto and fluorescent lighting was used. Furthermore, only one-sided signs were formed, and thus an opaque white backing sheet was used in the trials.

Light meter readings were taken at two positions on each of the signs, midway from the light source and at the opposite end of the light source.

The results of the tests are shown below:

TABLE 1

| Size of Sign (cm × cm) | | Light Meter Reading (Lux) | | (cm) Distance from light source light travelled |
|---|---|---|---|---|
| | | Midway from light source | At Opposite end of light source | |
| 30 × 16 | one-sided | 2600 | 2400 | 16 |
| | two-sided | 3400 | 2400 | |
| 30 × 30 | one-sided | 1500 | 1250 | 30 |
| | two-sided | 1950 | 1450 | |
| 60 × 45 | one-sided | 475 | 435 | 45 |
| | two-sided | 810 | 685 | |
| 60 × 60 | one-sided | 440 | 300 | 60 |
| | two-sided | 720 | 440 | |

Further experiments were conducted by Optical and Photometric Technology Pty, a NATA registered organisation on two acrylic sheets which had the dimensions 10 mm (thick)×520 mm (long)×260 mm (wide). One of the sheets had the dot matrix applied to both sides, the other sheet had the same pattern applied but to only one side. The panels were illuminated on the edge along the 260 mm side. The illumination source was an Osram Deluxe SPL 11W/21 orientated horizontally and housed in a triangular aluminium extrusion. The results of the experiments on each sheet are shown in Table 2. Table 2 illustrates the sheets per se and the values represent the Luminance values at that particular location on the sheet. The light source is attached at the top of the page.

TABLE 2

| 260 mm (Light Source) | | |
|---|---|---|
| 202 | 200 | 121 |
| [52] | [55] | [37] |
| 224 | 221 | 146 |
| [74] | [68] | [48] |
| 218 | 204 | 158 |
| [80] | [74] | [59] |
| 184 | 177 | 146 |
| [87] | [75] | [60] |
| 520 mm | | |
| 143 | 140 | 119 |
| [79] | [72] | [57] |
| 109 | 107 | 92 |
| [67] | [59] | [54] |
| 76 | 72 | 63 |
| [61] | [58] | [52] |
| 59 | 57 | 52 |
| [60] | [58] | [54] |

Luminance values in lumens for the double sided application are in numbers without brackets, luminance values in lumens for the single sided application are in [Brackets]

The test results in both trials clearly indicate a marked improvement of the illumination of the sign when the dot matrix is applied to both sides of the transparent medium. This is especially true in the middle of the sign wherein most of the message to be illuminated is placed. Furthermore the effectiveness of the dot matrix is still good even for larger sizes.

The display system in accordance with the invention can be used in small and very large displays and advantageously providing good illumination without the large number of lights previously required. Manufacturing and maintenance of the signs is less time consuming and simpler.

Although the present invention has been described with reference to preferred embodiments, workers skilled in the art will recognize that changes may be made in form and detail without departing from the spirit and scope of the invention.

What is claimed is:

1. An edgelit illuminated display system comprising:
   a transparent medium having first and second opposing surfaces and at leastone edge operable with a light source for illuminating the first and second surfaces; and
   a matrix of dots on each of the surfaces arranged to allow interaction of light between the surfaces, the matrix of dots on at least one of the surfaces substantially covering the entire surface for providing an even and increased illumination throughout the surface, wherein when a graphic image is supported over the surface, the graphic image is evenly illuminated.

2. The edgelit illuminated display system of claim 1, wherein the dots are translucent.

3. The edgelit illuminated display system of claim 1, further comprising at least one sufficiently translucent sheet having at least one light-coloured surface thereon.

4. The edgelit illuminated display system of claim 3, wherein the at least one light-coloured surface of the translucent sheet contacts the first surface of the transparent medium with the matrix of clots thereon and wherein the graphic image is formed on the translucent sheet opposite the light-coloured surface.

5. The edgelit illuminated display system of claim 4, further comprising a light-coloured opaque backing sheet which contacts the second surface of the transparent medium with the matrix of dots thereon.

6. The edgelit illuminated display system of claim 1, wherein the matrix of dots is configured such that the density of dots in number increases away from the edge of the transparent medium which is operable with the light source.

7. The edgelit illuminated display system of claim 1, wherein the matrix of dots are applied to the transparent medium by etching, painting, screen-printing or as a transparent film with the matrix of dots applied thereto and the film then adhered to the transparent medium.

8. The edgelit illuminated display system of claim 1, wherein the dots are opaque.

9. The edgelit illuminated display system of claim 1, wherein the matrix of dots is configured such that the density of dots in size increases away from the edge of the transparent medium which is operable with the light source.

10. An edgelit illuminated display system comprising:
    a housing having a light source therein;
    a transparent medium having first and second opposing surface and at least one edge operable with the light source for illuminating the first and second surfaces; and
    a matrix of dots on each of the surfaces arranged to allow interaction of light between the surfaces, the matrix of dots on at least one of the surfaces substantially covering the entire surface for providing an even and increased illumination throughout the surface, wherein when a graphic image is supported over the surface, the graphic image is evenly illuminated.

11. The edgelit illuminated display system of claim 10, further comprising a first translucent sheet having at least one light-colored surface thereon for diffusing and reflecting light, wherein the light-colored surface of the first translucent sheet communicates with the first surface of the transparent medium with the matrix of dots thereon.

12. The edgelit illuminated display system of claim 11, wherein the graphic image is formed on a surface of the first translucent sheet opposite the light-colored surface.

13. The edgelit illuminated display system of claim 12, further comprising a second translucent sheet having at least one light-colored surface thereon for diffusing and reflecting light, wherein the second translucent sheet communicates with the second surface of the transparent medium with the matrix of dots thereon.

14. The edgelit illuminated display system of claim 10, wherein the matrix of dots is configured such that the density of dots increases away from the edge of the transparent medium.

15. The edgelit illuminated display system of claim 10, wherein the matrix of dots are applied to the transparent medium by etching, painting, screen-printing, or as a transparent film with the matrix of dots applied thereto and the film then adhered to the transparent medium.

16. The edgelit illuminated display system of claim 10, wherein the dots are translucent.

17. The edgelit illuminated display system of claim 10, wherein the dots are opaque.

* * * * *

UNITED STATES PATENT AND TRADEMARK OFFICE
CERTIFICATE OF CORRECTION

PATENT NO. : 5,390,436
DATED : February 21, 1995
INVENTOR(S) : JOHN ASHALL

It is certified that error appears in the above-indentified patent and that said Letters Patent is hereby corrected as shown below:

Col. 2, line 21, after "in the", insert --direction--

Col. 5, line 9, delete "leastone", insert --least one--

Signed and Sealed this

Eighteenth Day of February, 1997

Attest:

BRUCE LEHMAN

*Attesting Officer*      *Commissioner of Patents and Trademarks*